US009461793B2

United States Patent
Kim et al.

(10) Patent No.: US 9,461,793 B2
(45) Date of Patent: Oct. 4, 2016

(54) METHOD FOR DETERMINING THE TRANSMISSION OF A SOUNDING REFERENCE SIGNAL IN A WIRELESS COMMUNICATION SYSTEM, AND TERMINAL THEREFOR

(71) Applicant: LG ELECTRONICS INC., Seoul (KR)

(72) Inventors: Dongcheol Kim, Anyang-si (KR); Hangyu Cho, Anyang-si (KR); Seunghee Han, Anyang-si (KR); Minseok Noh, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/349,026

(22) PCT Filed: Nov. 1, 2012

(86) PCT No.: PCT/KR2012/009127
§ 371 (c)(1),
(2) Date: Apr. 1, 2014

(87) PCT Pub. No.: WO2013/066075
PCT Pub. Date: May 10, 2013

(65) Prior Publication Data
US 2015/0036601 A1   Feb. 5, 2015

Related U.S. Application Data

(60) Provisional application No. 61/553,962, filed on Nov. 1, 2011.

(51) Int. Cl.
*H04W 4/00*  (2009.01)
*H04L 5/00*  (2006.01)
(Continued)

(52) U.S. Cl.
CPC ............ *H04L 5/0048* (2013.01); *H04L 5/001* (2013.01); *H04L 25/0224* (2013.01); *H04W 72/0446* (2013.01); *H04L 5/0051* (2013.01); *H04L 5/0053* (2013.01)

(58) Field of Classification Search
None
See application file for complete search history.

(56) References Cited

U.S. PATENT DOCUMENTS

2009/0238241 A1* 9/2009 Hooli et al. .................. 375/133
2010/0246561 A1* 9/2010 Shin et al. .................... 370/345
(Continued)

FOREIGN PATENT DOCUMENTS

CN   102055700 A   5/2011
CN   102118873 A   7/2011
(Continued)

OTHER PUBLICATIONS

Panasonic, Uplink signalling for carrier aggregation enhancement, 3GPP TSG RAN WG1#66b R1-113115, Oct. 4, 2011.
(Continued)

*Primary Examiner* — Otis L Thompson, Jr.
(74) *Attorney, Agent, or Firm* — Dentons US LLP

(57) ABSTRACT

The invention relates to a method for determining the transmission of a sounding reference signal (SRS) by a terminal in a wireless communication system, which can include a step of determining whether a physical uplink control channel (PUCCH) or a physical uplink shared channel (PUSCH) in a first timing advance (TA) group, or an SRS in a second TA group in the same subframe, is to be transmitted when the transmission timing of the PUCCH or the PUSCH in a cell of the first TA group and the transmission timing of the SRS in a cell of the second TA group overlap each other in the same subframe.

8 Claims, 7 Drawing Sheets

(51) Int. Cl.
*H04L 25/02* (2006.01)
*H04W 72/04* (2009.01)

(56) References Cited

U.S. PATENT DOCUMENTS

| | | | |
|---|---|---|---|
| 2011/0092201 A1* | 4/2011 | Lindstrm et al. | 455/424 |
| 2011/0110398 A1 | 5/2011 | Zhang et al. | |
| 2011/0268028 A1* | 11/2011 | Stern-Berkowitz et al. | 370/328 |
| 2012/0002568 A1* | 1/2012 | Tiirola et al. | 370/252 |
| 2012/0039273 A1* | 2/2012 | Nam et al. | 370/329 |
| 2012/0057516 A1* | 3/2012 | Ahn | H04L 5/0048 370/312 |
| 2012/0257570 A1* | 10/2012 | Jang et al. | 370/328 |
| 2013/0083683 A1* | 4/2013 | Hwang | H04W 64/00 370/252 |
| 2013/0242911 A1* | 9/2013 | Heo et al. | 370/329 |
| 2015/0372792 A1* | 12/2015 | Damnjanovic | H04L 5/0048 370/329 |
| 2015/0382350 A1* | 12/2015 | Noh | H04B 7/155 370/329 |

FOREIGN PATENT DOCUMENTS

| | | |
|---|---|---|
| EP | 2378820 A2 | 10/2011 |
| KR | 1020110011568 A | 2/2011 |
| WO | 2010014821 A2 | 2/2010 |
| WO | 2011085200 A1 | 7/2011 |
| WO | 2011099324 A1 | 8/2011 |
| WO | 2011099830 A2 | 8/2011 |
| WO | 2011123805 A1 | 10/2011 |

OTHER PUBLICATIONS

LG Electronics, Multiple TA in UL CoMP, 3GPP TSG RAN WG1#66b R1-113283, Oct. 4, 2011.
LG Electronics, High-level View on UL CoMP, 3GPP TSG RAN WG1#66b R1-113279, Oct. 4, 2011.

* cited by examiner

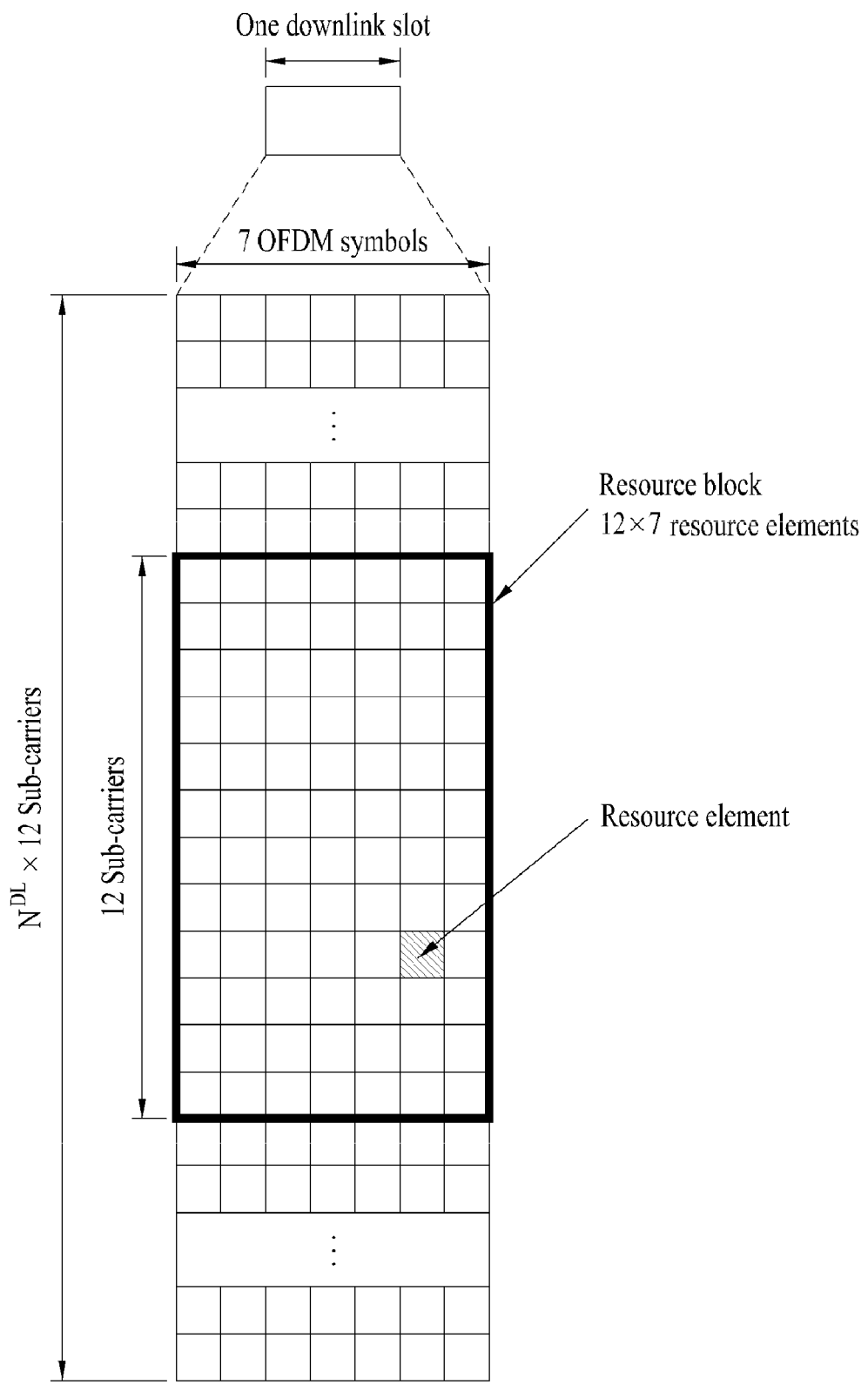

METHOD FOR DETERMINING THE TRANSMISSION OF A SOUNDING REFERENCE SIGNAL IN A WIRELESS COMMUNICATION SYSTEM, AND TERMINAL THEREFOR

This application is a 35 USC §371 National Stage entry of International Application No. PCT/KR2012/009127, filed on Nov. 11, 2012, and claims priority to US Provisional Application No. 61/553,962, filed Nov. 1, 2011, both of which are hereby incorporated by reference in their entireties as if fully set forth herein.

TECHNICAL FIELD

The present invention relates to wireless communication, and more particularly, to a method for determining transmission of a sounding reference signal in a wireless communication system, and a mobile station therefor.

BACKGROUND ART

It is expected that a long term evolution-advanced (LTE-A) system, which is the standard of the next generation wireless communication system, will support a coordinated multi point (CoMP) system and a multi user-MIMO (MU-MIMO) system, which have not been supported by the existing standard, so as to improve a data transmission rate. In this case, the CoMP system means that two or more base stations or cells perform communication with a mobile station by coordinating with each other to improve communication throughput between the base station (cell or sector) and the mobile station located in a shaded zone. Examples of the CoMP system may include a coordinated MIMO type joint processing (CoMP-JP) system through data sharing and a CoMP-coordinated scheduling/beamforming (CoMP-CS) system. According to the joint processing (CoMP-JP) system, the mobile station may simultaneously receive data from each base station that performs CoMP, and may improve receiving throughput by combining the signals received from each base station. Unlike the joint processing system, according to the coordinated scheduling/beamforming (CoMP-CS) system, the mobile station may momentarily receive data from one base station through beamforming. The MU-MIMO technology means that the base station allocates each antenna resource to different mobile stations and selects and schedules a mobile station that enables a high data transmission rate per antenna. This MU-MIMO system is to improve system throughput.

Also, the next generation LTE-A system is designed to enable large scaled data transmission. The LTE-A system adopts the carrier aggregation (CA) technology to perform data transmission by aggregating a plurality of component carriers (CCs), whereby a transmission bandwidth of the mobile station may be improved and usage efficiency of the frequency may be increased. The LTE-A system may extend the bandwidth to reach 100 MHz by simultaneously using a plurality of carriers (that is, multiple carriers) in group not a single carrier used in the existing LTE Rel-8/9 system. In other words, the LTE-A system has re-defined a carrier, which is defined to reach maximum 20 MHz in the existing LTE Rel-8/9 system, as a component carrier and has allowed one mobile station to use maximum five component carriers (CCs) through the carrier aggregation technology.

Under the circumstances that the CA technology is introduced and a plurality of timing advance (TA) groups exist, if a PUSCH, PRACH, PUCCH and SRS are simultaneously transmitted through the plurality of TA groups, a method for determining whether to transmit or drop a sounding reference signal (SRS) has not been suggested up to now.

DISCLOSURE

Technical Problem

An object of the present invention devised to solve the conventional problem is to provide a method for determining transmission of a sounding reference signal (SRS) by a mobile station in a wireless communication system.

Another object of the present invention devised to solve the conventional problem is to provide a mobile station for determining transmission of a sounding reference signal (SRS) in a wireless communication system.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve these objects and other advantages and in accordance with the purpose of the invention, a method for determining the transmission of a sounding reference signal (SRS) by a mobile station in a wireless communication system comprises the step of determining whether a physical uplink control channel (PUCCH) or a physical uplink shared channel (PUSCH) in a first timing advance (TA) group, or an SRS in a second TA group is to be transmitted for the same subframe when the transmission timing of the PUCCH or the PUSCH in a cell of the first TA group and the transmission timing of the SRS in a cell of the second TA group overlap each other within the same subframe.

When the transmission timing of the PUCCH in the cell of the first TA group and the transmission timing of the SRS in the cell of the second TA group overlap each other within the same subframe, if the timing difference between the first TA group and the second TA group is matched with a symbol level, the overlapped symbols may be punctured or empty, and the SRS may be transmitted from the second TA group.

When the transmission timing of the PUCCH in the cell of the first TA group and the transmission timing of the SRS in the cell of the second TA group overlap each other within the same subframe, if the timing difference between the first TA group and the second TA group is not matched with a symbol level, or if a symbol corresponding to the PUCCH includes a reference signal, or if the PUCCH is a shortened format, the SRS transmission may be dropped.

When the transmission timing of the PUCCH in the cell of the first TA group and the transmission timing of the SRS in the cell of the second TA group overlap each other within the same subframe, if the timing difference between the first TA group and the second TA group is not matched with a symbol level, or if a symbol corresponding to the PUCCH includes a reference signal, or if the PUSCH is a rate-matched PUSCH, the SRS transmission may be dropped.

In another aspect, to achieve these objects and other advantages and in accordance with the purpose of the invention, a mobile station for determining the transmission of a sounding reference signal (SRS) in a wireless communication system comprises a processor configured to determine whether a physical uplink control channel (PUCCH) or a physical uplink shared channel (PUSCH) in a first timing advance (TA) group, or an SRS in a second TA group is to be transmitted for the same subframe when the transmission timing of the PUCCH or the PUSCH in a cell of the first TA group and the transmission timing of the SRS in a cell of the second TA group overlap each other within the same subframe.

When the transmission timing of the PUCCH in the cell of the first TA group and the transmission timing of the SRS in the cell of the second TA group overlap each other within the same subframe, if the timing difference between the first TA group and the second TA group is matched with a symbol level, the processor may puncture or empty the overlapped symbols and determines to transmit the SRS from the second TA group.

When the transmission timing of the PUCCH in the cell of the first TA group and the transmission timing of the SRS in the cell of the second TA group overlap each other within the same subframe, if the timing difference between the first TA group and the second TA group is not matched with a symbol level, or if a symbol corresponding to the PUCCH includes a reference signal, or if the PUCCH is a shortened format, the processor may determine to drop the SRS transmission.

When the transmission timing of the PUCCH in the cell of the first TA group and the transmission timing of the SRS in the cell of the second TA group overlap each other within the same subframe, if the timing difference between the first TA group and the second TA group is not matched with a symbol level, or if a symbol corresponding to the PUCCH includes a reference signal, or if the PUSCH is a rate-matched PUSCH, the processor may determine to drop the SRS transmission.

Advantageous Effects

As the SRS is dropped appropriately in accordance with various embodiments of the present invention, the power of the mobile station may be controlled, whereby communication throughput may be improved.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 is a diagram illustrating a time-frequency resource grid structure of a downlink in a 3GPP LTE system;

BEST MODE FOR CARRYING OUT THE INVENTION

Figure 1:
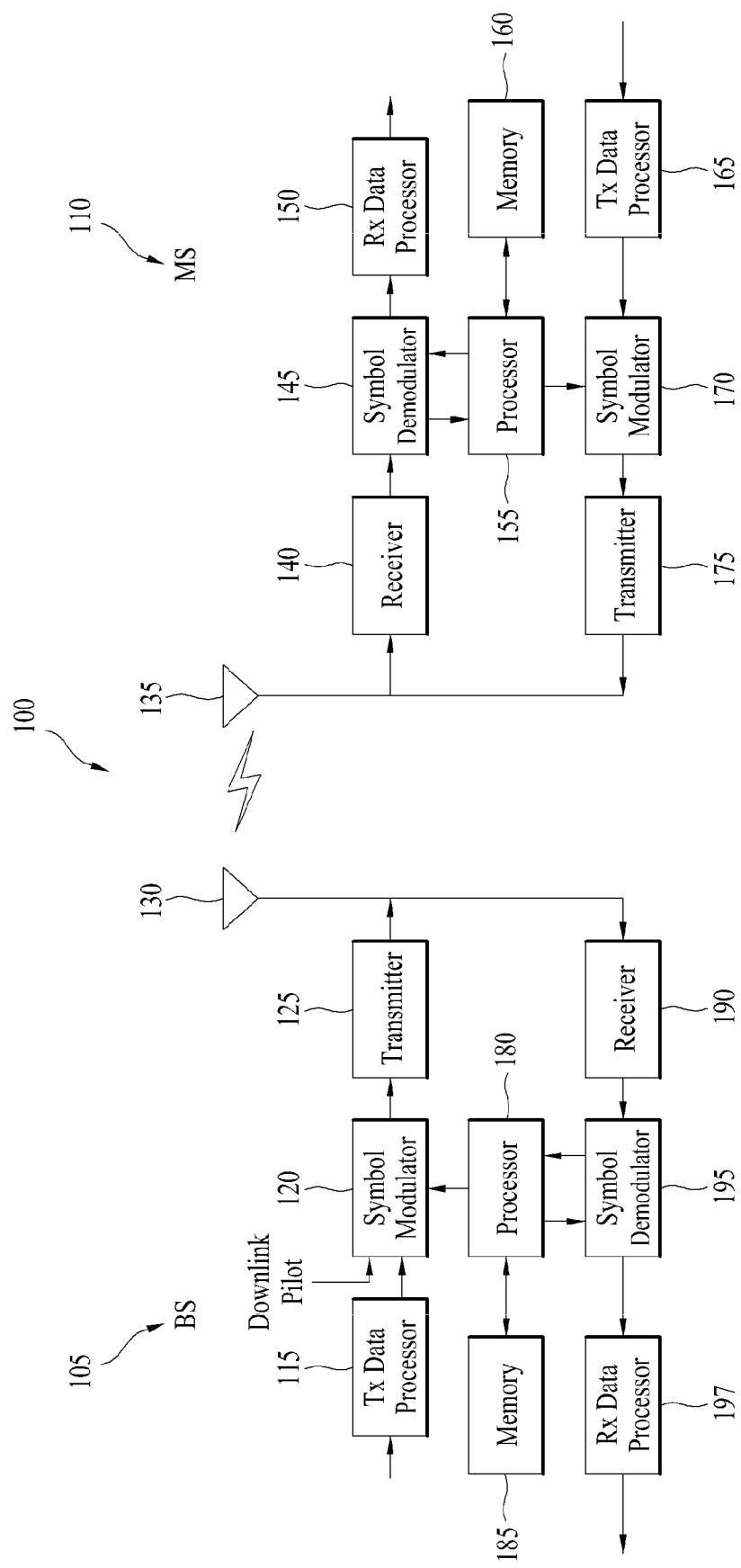
FIG. 1 is a block diagram illustrating configurations of a base station 105 and a mobile station 110 in a wireless communication system.

Hereinafter, the preferred embodiments of the present invention will be described in detail with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, although the following description will be made based on the assumption that the mobile communication system is the 3GPP LTE or LTE-A system, the following description may be applied to other mobile communication systems except for particular matters of the 3GPP LTE or LTE-A system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Moreover, in the following description, it is assumed that a mobile station refers to a mobile or fixed type user equipment such as a user equipment (UE), an advanced mobile station (AMS) and a machine to machine (M2M) device. Also, it is assumed that the base station refers to a random node of a network terminal, such as Node B, eNode B, and access point (AP), which performs communication with the mobile station. In this specification, the base station may be used as a concept that includes a cell, sector, etc.

In a wireless communication system, a mobile station may receive information from a base station through a downlink (DL), and may also transmit information to the base station through an uplink. Examples of information transmitted from and received by the mobile station include data and various kinds of control information. Various physical channels exist depending on types and usage of information transmitted from or received by the mobile station.

The following technology may be used for various wireless access systems such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as universal terrestrial radio access (UTRA) or CDMA2000. The TDMA may be implemented by the radio technology such as global system for mobile communications (GSM)/ general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3$^{rd}$ generation partnership project long term evolution (3GPP LTE) communication system is a part of an evolved UMTS (E-UMTS) that uses E-UTRA, and uses OFDMA in a downlink while uses SC-FDMA in an uplink. LTE-advanced (LTE-A) is an evolved version of the 3GPP LTE system.

Although the following description will be based on the 3GPP LTE/LTE-A to clarify description of the present invention, it is to be understood that the technical spirits of the present invention is not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 1 is a block diagram illustrating configurations of a base station 105 and a mobile station 110 in a wireless communication system.

Although one base station 105, one mobile station 110 are shown for simplification of a wireless communication system 100, the wireless communication system 100 may include one or more base stations and/or one or more mobile stations.

Referring to FIG. 1, the base station 105 may include a transmitting (Tx) data processor 115, a symbol modulator 120, a transmitter 125, a transmitting and receiving antenna 130, a processor 180, a memory 185, a receiver 190, a symbol demodulator 195, and a receiving (Rx) data processor 297. The mobile station 110 may include a Tx data processor 165, a symbol modulator 170, a transmitter 175, a transmitting and receiving antenna 135, a processor 155, a memory 160, a receiver 140, a symbol demodulator 155, and an Rx data processor 150. Although the antennas 130 and 135 are respectively shown in the base station 105 and the mobile station 110, each of the base station 105 and the mobile station 110 includes a plurality of antennas. Accordingly, the base station 105 and the mobile station 110 according to the present invention support a multiple input multiple output (MIMO) system. Also, the base station 105 according to the present invention may support both a single user-MIMO (SU-MIMO) system and a multi user-MIMO (MU-MIMO) system.

On a downlink, the Tx data processor 115 receives traffic data, formats and codes the received traffic data, interleaves and modulates (or symbol maps) the coded traffic data, and provides the modulated symbols ("data symbols"). The symbol modulator 120 receives and processes the data symbols and pilot symbols and provides streams of the symbols.

The symbol modulator 120 multiplexes the data and pilot symbols and transmits the multiplexed data and pilot symbols to the transmitter 125. At this time, the respective transmitted symbols may be a signal value of null, the data symbols and the pilot symbols. In each symbol period, the pilot symbols may be transmitted continuously. The pilot symbols may be frequency division multiplexing (FDM) symbols, orthogonal frequency division multiplexing (OFDM) symbols, time division multiplexing (TDM) symbols, or code division multiplexing (CDM) symbols.

The transmitter 125 receives the streams of the symbols and converts the received streams into one or more analog symbols. Also, the transmitter 125 generates downlink signals suitable for transmission through a radio channel by additionally controlling (for example, amplifying, filtering and frequency upconverting) the analog signals. Subsequently, the downlink signals are transmitted to the mobile station through the antenna 130.

In the configuration of the mobile station 110, the antenna 135 receives the downlink signals from the base station 105 and provides the received signals to the receiver 140. The receiver 140 controls (for example, filters, amplifies and frequency downcoverts) the received signals and digitalizes the controlled signals to acquire samples. The symbol demodulator 145 demodulates the received pilot symbols and provides the demodulated pilot symbols to the processor 155 to perform channel estimation.

Also, the symbol demodulator 145 receives a frequency response estimation value for the downlink from the processor 155, acquires data symbol estimation values (estimation values of the transmitted data symbols) by performing data demodulation for the received data symbols, and provides the data symbol estimation values to the Rx data processor 150. The Rx data processor 50 demodulates (i.e., symbol de-mapping), deinterleaves, and decodes the data symbol estimation values to recover the transmitted traffic data.

Processing based on the symbol demodulator 145 and the Rx data processor 150 is complementary to processing based on the symbol demodulator 120 and the Tx data processor 115 at the base station 105.

On an uplink, the Tx data processor 165 of the mobile station 110 processes traffic data and provides data symbols. The symbol modulator 170 receives the data symbols, multiplexes the received data symbols with the pilot symbols, performs modulation for the multiplexed symbols, and provides the streams of the symbols to the transmitter 175. The transmitter 175 receives and processes the streams of the symbols and generates uplink signals. The uplink signals are transmitted to the base station 105 through the antenna 135.

The uplink signals are received in the base station 105 from the mobile station 110 through the antenna 130, and the receiver 190 processes the received uplink signals to acquire samples. Subsequently, the symbol demodulator 195 processes the samples and provides data symbol estimation values and the pilot symbols received for the uplink. The Rx data processor 197 recovers the traffic data transmitted from the mobile station 110 by processing the data symbol estimation values.

The processors 155 and 180 of the mobile station 110 and the base station 105 respectively command (for example, control, adjust, manage, etc.) the operation at the mobile station 110 and the base station 105. The processors 155 and 180 may respectively be connected with the memories 160 and 185 that store program codes and data. The memories 160 and 185 respectively connected to the processor 180 store operating system, application, and general files therein.

Each of the processors 155 and 180 may be referred to as a controller, a microcontroller, a microprocessor, and a microcomputer. Meanwhile, the processors 155 and 180 may be implemented by hardware, firmware, software, or their combination. If the embodiment of the present invention is implemented by hardware, application specific integrated circuits (ASICs), digital signal processors (DSPs), digital signal processing devices (DSPDs), programmable logic devices (PLDs), and field programmable gate arrays (FPGAs) configured to perform the embodiment of the present invention may be provided in the processors 155 and 180.

Meanwhile, if the embodiment according to the present invention is implemented by firmware or software, firmware or software may be configured to include a module, a procedure, or a function, which performs functions or operations of the present invention. Firmware or software configured to perform the present invention may be provided in the processors 155 and 180, or may be stored in the memories 160 and 185 and driven by the processors 155 and 180.

Layers of a radio interface protocol between the mobile station 110 or the base station 105 and a wireless communication system (network) may be classified into a first layer L1, a second layer L2 and a third layer L3 on the basis of three lower layers of OSI (open system interconnection) standard model widely known in communication systems. A physical layer belongs to the first layer L1 and provides an information transfer service using a physical channel. A radio resource control (RRC) layer belongs to the third layer and provides control radio resources between the mobile station and the network. The mobile station and the base station may exchange RRC messages with each another through the RRC layer.

Figure 2A:
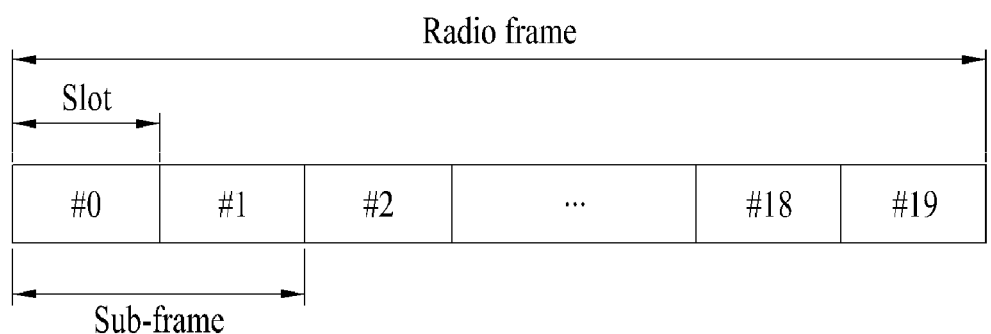
FIG. 2a is a diagram illustrating a structure of a radio frame used in a 3GPP LTE system which is an example of a wireless communication system.

FIG. 2*a* is a diagram illustrating a structure of a radio frame used in a 3GPP LTE system which is an example of a wireless communication system.

Referring to FIG. 2*a*, one radio frame has a length of 10 ms (327200×$T_s$) and includes ten(10) subframes of an equal size. Each sub frame has a length of 1 ms and includes two slots. Each slot has a length of 0.5 ms (15360$T_s$). In this case, $T_s$ represents a sampling time, and is expressed by $T_s=1/(15\ \text{kHz} \times 2048)=3.2552 \times 10^{-8}$ (about 33 ns). The slot includes a plurality of orthogonal frequency division multiplexing (OFDM) symbols or single carrier-frequency division multiple access (SC-FDMA) symbols in a time domain, and includes a plurality of resource blocks (RBs) in a frequency domain.

In the LTE system, one resource block includes twelve (12) subcarriers×seven (or six) OFDM symbols or SC-FDMA symbols. A transmission time interval (TTI), which is a transmission unit time of data, may be determined in a unit of one or more subframes. The aforementioned structure of the radio frame is only exemplary, and various modifications may be made in the number of subframes included in the radio frame or the number of slots included in the subframe, or the number of OFDM symbols or SC-FDMA symbols included in the slot.

Figure 2B:
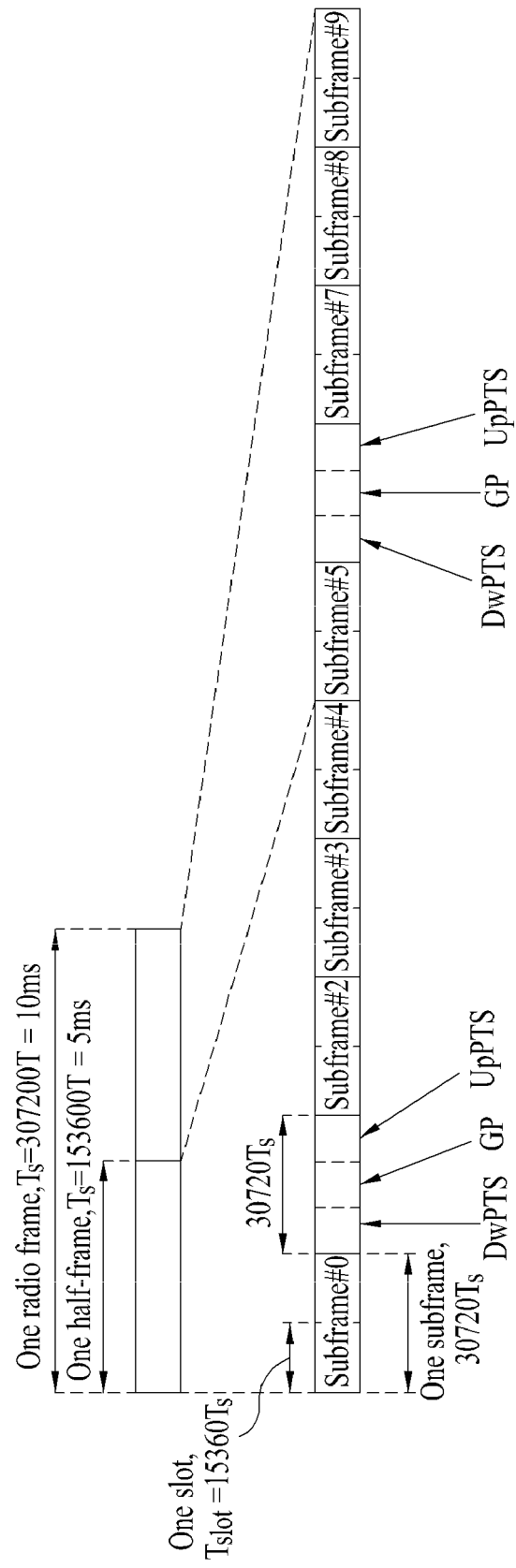
FIG. 2b is a diagram illustrating a frame structure type 2 used in used in a 3GPP LTE system which is an example of a wireless communication system.

FIG. 2*b* is a diagram illustrating a structure of a frame structure type 2 in a 3GPP LTE system which is an example of a wireless communication system.

Referring to FIG. 2*b*, the type 2 frame structure is applied to TDD. In the same manner as FIG. 2*a*, one radio frame has a length of 10 ms (327200$T_s$) and includes ten(10) subframes of an equal size. Each subframe has a length of 1ms and includes two slots. Each slot has a length of 0.5 ms (15360$T_s$). In this case, $T_s$ represents a sampling time, and is expressed by $T_s=1/(15\ \text{kHz} \times 2048)=3.2552 \times 10^{-8}$ (about 33 ns).

Each half frame includes five subframes, in which the subframe "D" is for downlink transmission, the subframe "U" is for uplink transmission, the subframe "S" is a special subframe that includes a downlink pilot time slot (DwPTS), a guard period (GP), and an uplink pilot time slot (UpPTS). In the special subframe, DwPTS is used for initial cell search, synchronization or channel estimation at the mobile station. UpPTS is used to synchronize uplink transmission of the mobile station and channel estimation at the base station. Also, the guard period is to remove interference occurring in the uplink due to multipath delay of downlink signals between the uplink and the downlink.

In case of 5 ms downlink-uplink switch-point period, the special subframe S exists per half-frame. In case of 5 ms downlink-uplink switch-point period, the special subframe S exists at the first half-frame only. Subframe indexes 0 and 5 (subframe 0 and 5) and DwPTS are for downlink transmission only. The subframe subsequent to the UpPTS and the special subframe is always for uplink transmission. If multicells are aggregated, the mobile station may assume the same uplink-downlink configuration for all the cells, and the guard periods of the special frames at different cells are overlapped for at least 1456 Ts. The aforementioned structure of the radio frame is only exemplary, and various modifications may be made in the number of subframes included in the radio frame or the number of slots included in the subframe, or the number of symbols included in the slot.

The following Table 1 illustrates a configuration of the special subframe (length of DwPTS/GP/UpPTS).

TABLE 1

| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The following Table 2 illustrates uplink-downlink configuration.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 2, in the 3GPP LTE system, the type 2 frame structure includes seven types of uplink-downlink configurations. The number or position of downlink subframes, special subframes and uplink subframes may be varied per configuration. Hereinafter, various embodiments of the present invention will be described based on the uplink-downlink configuration of the type 2 frame structure illustrated in Table 2.

Figure 3A:
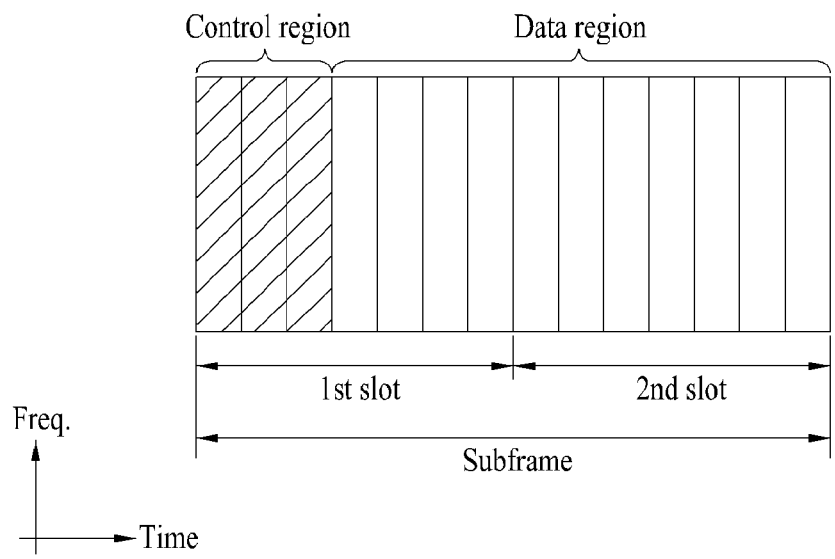
FIGS. 3a and 3b are diagrams illustrating structures of uplink and downlink subframes of a 3GPP LTE system which is an example of a wireless communication system.
Figure 3B:
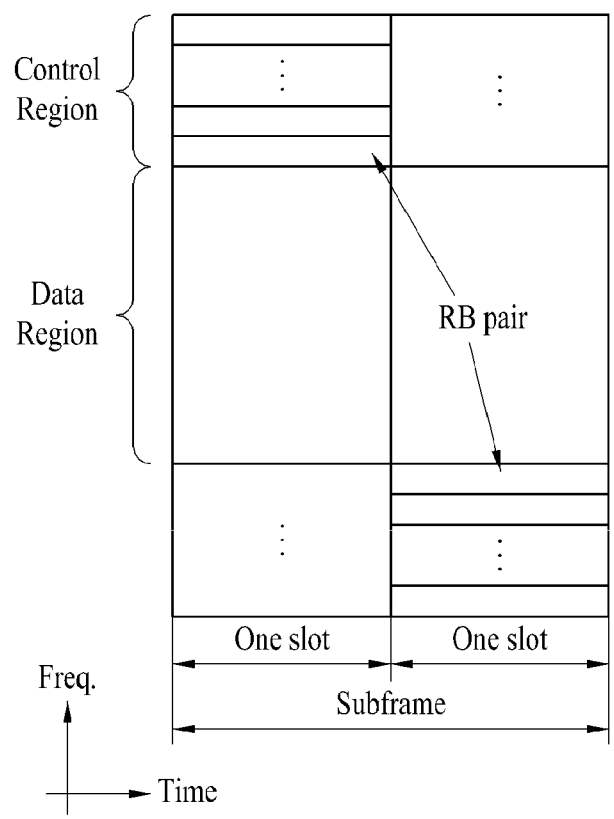

FIGS. 3a and 3b are diagrams illustrating structures of uplink and downlink subframes of a 3GPP LTE system which is an example of a wireless communication system.

Referring to FIG. 3a, one downlink subframe includes two slots in a time domain. Maximum three OFDM symbols located at the front of the first slot within one downlink subframe correspond to a control region to which control channels are allocated. The other OFDM symbols correspond to a data region to which a physical downlink shared channel (PDSCH) is allocated.

Examples of downlink control channels used in the 3GPP LTE system include a Physical Control Format Indicator Channel (PCFICH), a Physical Downlink Control Channel (PDCCH), and a Physical Hybrid ARQ Indicator Channel (PHICH). The PCFICH transmitted from the first OFDM symbol of the subframe carries information on the number (that is, size of control region) of OFDM symbols used for transmission of the control channels within the subframe. The control information transmitted through the PDCCH will be referred to as downlink control information (DCI). The DCI includes uplink resource allocation information, downlink resource allocation information, and uplink transmission (Tx) power control command for random mobile station groups. The PHICH carries ACK/NACK (acknowledgement/negative-acknowledgement) signals in response to uplink HARQ (Hybrid Automatic Repeat Request). In other words, the ACK/NACK signal for the uplink data transmitted from the mobile station is transmitted on the PHICH.

Now, the PDCCH, which is the downlink physical channel, will be described.

The base station may transmit a resource allocation and transport format (this may be referred to as DL grant) of the PDSCH, resource allocation information (this may be referred to as UL grant) of the PUSCH, aggregation of transmission power control commands for individual mobile stations within a random mobile station group, and activity information of voice over Internet protocol (VoIP) through the PDCCH. A plurality of PDCCHs may be transmitted within the control region. The mobile station may monitor the plurality of PDCCHs. The PDCCH is configured by aggregation of one or a plurality of continuous control channel elements (CCEs). The PDCCH of one or aggregation of several continuous CCEs may be transmitted through the control region after subblock interleaving. The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the correlation between the number of CCEs and a coding rate provided by the CCEs.

The control information transmitted from the base station through the PDCCH will be referred to as downlink control information (DCI). The base station may transmit the control information through the PDCCH in accordance with a DCI format illustrated in Table 3 below.

TABLE 3

| DCI Format | Description |
|---|---|
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

Referring to FIG. 3, the DCI format 0 represents uplink resource allocation information, the DCI formats 1 and 2 represent downlink resource allocation information, and the DCI formats 3 and 3A represent uplink transmit power control (TPC) command for random mobile station groups. In case of the DCI format 3/3A, the base station masks CRC with TPC-ID. TPC-ID is the identifier demasked by the mobile station to monitor the PDCCH carrying the TPC command. The TPC-ID may be referred to as the identifier used for PDCCH decoding by the mobile station to identify whether the TPC command has been transmitted on the PDCCH. The TPC-ID may be defined by reusing the existing identifiers, C-RNTI (Cell-Radio Network Temporary Identifier), PI-RNTI (Paging Indication-Radio Network Temporary Identifier), SC-RNTI (System Change-Radio Network Temporary Identifier), or RA-RNTI (Random Access Radio Network Temporary Identifier). Alternatively, the TPC-ID may be defined by a new identifier. The TPC-ID is different from C-RNTI which is the identifier for a specific mobile station in that the TPC-ID is the identifier for mobile stations of a specific aggregation within a cell, and is also different from PI-RNTI, SC-RNTI, and RA-RNTI, which are the identifiers for all the mobile stations within the cell. If the DCI includes TPC commands for N number of mobile stations, only the N number of mobile stations receive the TPC commands. If the TPC commands for all the mobile stations within the cell are included in the DCI, the TPC-ID becomes the identifier for all the mobile stations within the cell.

The mobile station searches for the TPC-ID by monitoring a set of PDCCH candidates from a search space within the subframe. At this time, the TPC-ID may be searched from a common search space or a user equipment (UE) specific search space. The common search space is the search space searched by all the mobile stations within the cell while the user equipment specific search space is the search space searched by a specific mobile station. If a CRC error is not detected through demaksing of TPC-ID from the corresponding PDCCH candidate, the mobile station may receive a TPC command on the PDCCH.

An identifier, TPC-ID for PDCCH carrying a plurality of TPC commands will be defined. If the TPC-ID is detected, the mobile station receives the TPC command on the corresponding PDCCH. The TPC command is used to control a transmission power of an uplink channel. Accordingly, failure of transmission to the base station due to wrong power control or interference to other mobile stations may be avoided.

Hereinafter, a method for mapping resources for PDCCH transmission in a base station of the LTE system will be described in brief.

Generally, the base station may transmit scheduling allocation information and other control information through the PDCCH. The physical control channel may be transmitted to one aggregation or a plurality of continuous control channel elements (CCEs). One CCE includes nine resource element groups (REGs). The number of resource element groups (RBGs) which are not allocated to a physical control format indicator channel (PCFICH) or a physical hybrid automatic repeat request indicator channel (PHICH) is $N_{REG}$. The CCEs available in the system are from 0 to $N_{CCE}-1$ (in this case,) $N_{CCE}=\lfloor N_{REG}/9 \rfloor$. The PDCCH supports multiple formats as expressed in Table 2 below. One PDCCH that includes n continuous CCEs starts from CCE that performs i mod n=0 (in this case, i is a CCE number). The multiple PDCCHs may be transmitted to one subframe.

TABLE 4

| PDCCH format | Number of CCEs | Number of resource-element groups | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

Referring to Table 4, the base station may determine a PDCCH format depending on how many regions control information are transmitted. The mobile station may reduce overhead by reading out the control information in a unit of CCE.

Referring to FIG. 3b, the uplink subframe may be divided into a control region and a data region on a frequency domain. A physical uplink control channel (PUCCH), which carries uplink control information, is allocated to the control region. A physical uplink shared channel (PUSCH), which carries user data, is allocated to the data region. In order to maintain single carrier features, one mobile station does not transmit the PUCCH and the PUSCH at the same time. The PUCCH for one mobile station is allocated to resource block (RB) pair at one subframe. Resource blocks (RBs) belonging to the RB pair occupy different subcarriers for two slots. The RB pair allocated to the PUCCH is subjected to frequency hopping at a slot boundary.

FIG. 4 is a diagram illustrating a time-frequency resource grid structure of a downlink in a 3GPP LTE system.

A downlink signal transmitted from each slot may be expressed by a resource grid, which includes $N_{RB}^{DL} \times N_{sc}^{RB}$ number of subcarriers and $N_{symb}^{DL}$ number of OFDM (orthogonal frequency division multiplexing) symbols. In this case, $N_{RB}^{DL}$ represents the number of resource blocks (RBs) on the downlink, $N_{sc}^{RB}$ represents the number of subcarriers that constitute one resource block (RB), and $N_{symb}^{DL}$ represents the number of OFDM symbols at one downlink slot. The size of $N_{RB}^{DL}$ may be varied depending on a downlink transmission bandwidth configured within a cell and should satisfy $N_{RB}^{min,DL} \leq N_{RB}^{DL} \leq N_{RB}^{max,DL}$. In this case, $N_{RB}^{min,DL}$ is the smallest downlink bandwidth supported by the wireless communication system, and $N_{RB}^{max,DL}$ is the greatest downlink bandwidth supported by the wireless communication system. Although $N_{RB}^{min,DL}=6$ and $N_{RB}^{max,DL}=110$ may be provided, the present invention is not limited to this example. The number of OFDM symbols included in one slot may be varied depending on a length of cyclic prefix (CP) and interval of the subcarriers. In case of MIMO antenna transmission, one resource grid may be defined per one antenna port.

Each element within the resource grid for each antenna port is referred to as a resource element (RE), and is uniquely identified by a pair of indexes (k,l) within the slot. In this case, k is an index in the frequency domain, l is an index in the time domain. Also, k has any one value of 0, . . . , $N_{RB}^{DL} N_{sc}^{RB}-1$, and l has any one value of 0, . . . , $N_{symb}^{DL}-1$.

The resource block shown in FIG. 4 is used to describe the mapping relation between a physical channel and resource elements. The RB may be divided into a physical resource block (PRB) and a virtual resource block (VRB). The one physical resource block is defined by $N_{symb}^{DL}$ continuous OFDM symbols in the time domain and $N_{sc}^{RB}$ continuous subcarriers in the frequency domain. In this case, $N_{symb}^{DL}$ and $N_{sc}^{RB}$ may be the values previously defined. For example, $N_{symb}^{DL}$ and $N_{sx}^{RB}$ may be given as illustrated in Table 5 below. Accordingly, one PRB includes $N_{symb}^{DL} \times N_{sc}^{RB}$ number of resource elements. One PRB corresponds to, but not limited to, one slot in the time domain, and corresponds to, but not limited to, 180 kHz in the frequency domain.

TABLE 3

| Configuration | | $N_{sc}^{RB}$ | $N_{symb}^{DL}$ |
| --- | --- | --- | --- |
| Normal cyclic prefix | Δf = 15 kH | 12 | 7 |
| Extended cyclic prefix | Δf = 15 kH | | 6 |
| | Δf = 7.5 kH | 24 | 3 |

The PRB has values from 0 to $N_{RB-1}^{DL}$ in the frequency domain. The relation between the physical resource block number $n_{PRB}$ and resource elements (k, l) within one slot satisfies $$n_{PRB} = \left\lfloor \frac{k}{N_{sc}^{RB}} \right\rfloor.$$

The virtual resource block (VRB) has the same size as that of the physical resource block (PRB). The VRB may be divided into a localized virtual resource block (LVRB) and a distributed virtual resource blocks (DVRB). For each VRB, a pair of VRBs in two slots within one subframe are allocated together with a single virtual resource block number $n_{VRB}$.

The VRB may have the same size as that of the PRB. Two types of VRBs are defined, wherein the first type is the localized VRB (LVRB) and the second type is the distributed VRB (DVRB). For each VRB, a pair of VRBs are allocated to two slots of one subframe together with a single VRB index (hereinafter, referred to as VRB number). In other words, $N_{RB}^{DL}$ number of VRBs belonging to the first slot of two slots constituting one subframe are allocated with any one index of 0 to $N_{RB-1}^{DL}$, $N_{RB}^{DL}$ number of VRBs belonging to the second slot are allocated with any one index of 0 to $N_{RB-1}^{DL}$.

Hereinafter, a procedure of transmitting a PDCCH from a base station to a mobile station in an LTE system will be described.

The base station determines a PDCCH format depending on the DCI transmitted to the mobile station, and attaches cyclic redundancy check (CRC) to the control information. The CRC is masked with a unique identifier (for example, radio network temporary identifier (RNTI)) depending on owner of the PDCCH or usage of the PDCCH. If the PDCCH is for a specific mobile station, cell-RNTI (C-RNTI) of the corresponding mobile station may be masked with the CRC. If the PDCCH is for a paging message, a paging indicator identifier, for example, Paging-RNTI (P-RNTI) may be masked with the CRC. If the PDCCH is for system information, system information identifier and system information RNTI (SI-RNTI) may be masked with the CRC. In order to indicate a random access response which is the response to transmission of random access preamble of the mobile station, a random access RNTI (RA-RNTI) may be masked with the CRC. The following Table 6 illustrates an example of identifiers masked with the PDCCH.

TABLE 6

| Type | Identifier | Description |
|---|---|---|
| UE-specific | C-RNTI | used for the UE corresponding to the C-RNTI. |
| Common | P-RNTI | used for paging message. |
| | SI-RNTI | used for system information (It could be differentiated according to the type of system information). |
| | RA-RNTI | used for random access response (It could be differentiated according to subframe or PRACH slot index for UE PRACH transmission). |
| | TPC-RNTI | used for uplink transmit power control command (It could be differentiated according to the index of UE TPC group). |

If the C-RNTI is used, the PDCCH carries control information for the corresponding specific mobile station. If another RNTI is used, the PDCCH carries common control information received by all mobile stations or a plurality of mobile stations within the cell. The base station generates coded data by performing channel coding for the DCI to which CRC is added. And, the base station performs rate matching based on the number of CCEs allocated to PDCCH, R-PDCCH format. Afterwards, the base station generates modulation symbols by modulating the coded data, and maps the modulation symbols into physical resource elements.

Carrier Aggregation

3GPP (3rd Generation Partnership Project) designates the next generation wireless communication system of the LTE system as a long term evolution-advanced (LTE-A) system and designs the next generation wireless communication system to enable data transmission of high speed and large capacity. The LTE-A system adopts the carrier aggregation (CA) technology and performs transmission by aggregating a plurality of component carriers (CCs), whereby a transmission bandwidth of the mobile station is improved and usage frequency of the frequency is increased. The LTE-A system may extend the bandwidth to reach 100 MHz by simultaneously using and grouping a plurality of carriers (that is, multiple carriers) not a single carrier used in the existing LTE Rel-8/9. In other words, carriers defined to reach maximum 20 MHz in the existing LTE Rel-8/9 have been re-defined and the carrier aggregation technology have allowed one mobile station to use maximum five component carriers (CCs).

The current carrier aggregation technology has features as follows.

(1) The carrier aggregation technology supports aggregation of contiguous component carriers, and supports aggregation of non-contiguous component carriers.

(2) The number of carrier aggregations on the uplink may be different from that of carrier aggregations on the downlink. If the current system should be compatible with the existing system, the same number of component carriers may be configured on the uplink and the downlink.

(3) Different numbers of component carriers for the uplink and the downlink may be configured to acquire different transmission bandwidths.

(4) Each component carrier (CC) independently transmits one transmission block to the mobile station, and includes an independent hybrid automatic repeat request (HARQ) mechanism.

Unlike the existing LTE system that uses one carrier, a method for effectively controlling component carriers in carrier aggregation that uses a plurality of component carriers has been required. In order to efficiently control the component carriers, the component carriers may be classified in accordance with their functions and features. The component carriers may be divided into a primary component carrier (PCC) and secondary component carrier (SCC). The primary component carrier PCC is the component carrier that becomes a core for control of several component carriers when the component carriers are used, and is defined for each mobile station. The primary component carrier PCC may be referred to as a primary cell (PCell).

The other component carriers except for one primary component carrier PCC are defined as secondary component carriers SCCs. The secondary component carrier SCC may be referred to as a secondary cell (SCell). The primary component carrier may serve as a core carrier that controls all the aggregated component carriers. The other secondary component carriers may serve to provide additional frequency resources for providing a high transmission rate. For example, connection (RRC) for signaling between the base station and the mobile station may be performed through the primary component carrier. Information for security and upper layer may also be provided through the primary component carrier. Actually, if only one component carrier exists, the corresponding component carrier will be the primary component carrier. At this time, the component carrier may perform the same function as that of the carrier of the existing LTE system.

In the carrier aggregation, the downlink resource may be defined as a downlink component carrier (DL CC), and the uplink resource may be defined as an uplink component carrier (UL CC). Also, combination of the downlink resource and the uplink resource may be referred to as a cell. However, if the DL CC and the UL CC are configured asymmetrically with each other, the cell may refer to the DL CC (or UL CC) only. For example, if one serving cell is configured in a specific mobile station, the mobile station has 1 DL CC and 1 UL CC. However, if two or more serving cells are set to the specific mobile station, the mobile station has DL CCs equivalent to the number of cells, and the number of UL CCs may be equal to or smaller than the number of DL CCs. Alternatively, if a plurality of serving cells are set to the specific mobile station, the mobile station may be supported by CA environment where the number of UL CCs is more than the number of DL CCs.

Linkage between a carrier frequency (center frequency of cell) of the downlink resource and a carrier frequency of the uplink resource may be indicated by system information (SI) transmitted on the downlink resource. For example, combination of DL resource and UL resource may be configured by linkage defined by system information block type 2 (SIB2).

In accordance with the above definition, carrier aggregation (CA) may be referred to as aggregation of two or more cells of which carrier frequencies are different from each other. In other words, the case where two or more serving cells of which carrier frequencies are different from each other are set to the specific mobile station may be referred to as the CA environment. The bandwidth increased by aggregation of one or more secondary cells SCells and the primary cell PCell may be supported to the mobile stations that support CA.

In this case, the serving cell may be the PCell or SCell. If the mobile station which is RRC connected (RRC_CONNECTED) does not support CA, only one serving cell, which includes the PCell, exists. Alternatively, if the mobile station which is RRC connected (RRC_CONNECTED) supports CA, the serving cell refers to a set of one or more cells, which include PCell and SCells.

The PCell is the cell that is a core of control related communication, among serving cells configured under the CA environment. The PCell may be used such that the mobile station performs an initial connection establishment procedure, connection re-establishment procedure, or handover procedure. The mobile station may receive important control information (for example, PUCCH) through its PCell. Also, the mobile station may perform a monitoring procedure related to change and acquisition of the system information at the PCell only. However, the mobile station may receive control information through the SCell as the case may be. For the mobile station that supports CA, the base station may change the PCell through the handover procedure only, which uses RRCConnectionReconfiguration message including mobilityControlInfo.

Next, the SCells mean the other cells except for the PCell, among the serving cells configured under the CA environment. No PUCCH exists in the SCells. If the SCell is additionally provided, the base station may provide the mobile station, which supports CA, with all kinds of system information related to action at the corresponding cell of the RRC_CONNECTED state through dedicated signaling. For the SCells, the system information may be changed by release and addition of the corresponding SCell through one RRCConnectionReconfiguration message. The base station may transmit dedicated signaling having a parameter different from that included in the broadcast message at the corresponding SCell to the mobile station. After initial security activation procedure, the base station may set one or more SCells, in addition to the PCell (set as the serving cell during connection establishment procedure), to the mobile station. The PCell may be used to provide security input and upper layer system information, while the SCell may be used to provide additional downlink resource and may be used to provide uplink resource if necessary. The base station may independently add, remove or correct the SCell through the RRC connection re-establishment procedure based on RRCConnectionReconfiguration message that includes mobilityControlInfo or not.

In carrier aggregation, the multiple carriers may be divided into the PCell and the SCells, which are user equipment specific (UE-specific) parameters. The specific mobile station may have one or more configured serving cells. If a plurality of configured serving cells exist, one of the cells becomes the PCell and the other cells become the SCells. In this case, the PCell may be configured as the cell having the lowest index of cell indexes (for example, ServCellIndex). Also, when the mobile station has a plurality of configured cells in case of TDD, UL-DL configuration that defines UL subframe through which ACK/NACK for a PDSCH is transmitted for a specific DL subframe may equally be performed for all the cells.

Also, the mobile station may transmit uplink control information, such as channel state information (CSI) (refer to CQI, RI, PMI, etc.) measured from one or more CCs and HARQ ACK/NACK, from one CC, which is previously determined, to the base station. For example, the mobile station may collect a plurality of kinds of ACK/NACK information received from the PCell DL CC and the SCell(s) DL CC (for example, ACK/NACK multiplexing or ACK/NACK bundling) and transmit the collected ACK/NACK information by using one PUCCH through UL CC within the PCell.

Figure 5:
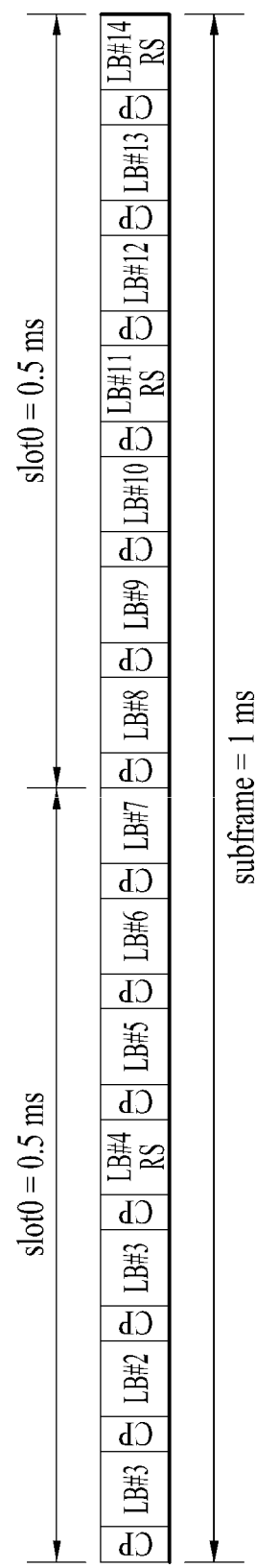
FIG. 5 is a diagram illustrating an example of an uplink subframe structure that includes SRS symbol in a 3GPP LTE system.

FIG. 5 is a diagram illustrating an example of an uplink subframe structure that includes SRS symbol in a 3GPP LTE system.

Referring to FIG. 5, a sounding reference signal (SRS) is transmitted through the last SC-FDMA symbol located on a time axis for one subframe. The SRSs of several mobile stations, which are transmitted to the last SC-FDMA symbol of the same subframe, may be identified from one another in accordance with frequency position/sequence. The sounding reference signal (SRS) has no relation with transmission of control information and/or uplink data, and is mainly used to evaluate channel quality, whereby frequency-selective scheduling may be performed on the uplink. However, the SRS may be used to provide various functions to a mobile station, which is not scheduled recently, or may be used to improve power control. The SRS is a reference signal used for uplink channel measurement and as a pilot signal transmitted from each mobile station to the base station, is used by the base station to estimate a channel status from each mobile station to the base station. The channel that transmits the SRS may have different transmission bandwidths and different transmission periods for each mobile station in accordance with the status of each mobile station. The base station may determine a mobile station of which data channel should be scheduled per subframe, on the basis of the channel estimated result.

On the assumption that the radio channel is reciprocal between the uplink and the downlink, the SRS may be used to estimate downlink channel quality. This assumption is useful in a time division duplex (TDD) system in which the uplink and the downlink share the same frequency domain and are separated from each other in the time domain. The subframe for which the SRS is transmitted by the mobile station within the cell may be indicated by cell-specific broadcast signaling. A 4-bit sized cell-specific 'srsSubframe-Configuration' parameter indicates 15 available subframe sets for which the SRS may be transmitted within each radio frame. This structure provides flexibility in controlling SRS overhead. As shown in FIG. 9, the mobile station may transmit the SRS through the last SC-FDMA symbol for the subframe.

Accordingly, the SRS and the demodulation-reference signal (DM-RS) are located at their respective SC-FDMA symbol positions different from each other for the subframe. The sounding reference signals of several mobile stations, which are transmitted to the last SC-FDMA of the same subframe, may be identified from one another depending on the frequency position. Since PUSCH data of the mobile station are not transmitted through the SC-FDMA symbol designed for the SRS, SRS symbol is provided per subframe in the worst case, whereby sounding overhead of 7% may occur.

CAZAC sequences generated from one CAZAC sequence through cyclic shift have zero-correlation values with the other sequences having their respective cyclic shift values different from one another. The SRSs in the same frequency domain may be identified from one another in accordance with the CAZAC sequence shift values by using the zero-correlation feature. The SRS of each mobile station is allocated on the frequency in accordance with the parameter set by the base station. The mobile station performs frequency hopping of the sounding reference signal to transmit the SRS to the full uplink data transmission bandwidth.

As described above, in the 3GPP LTE Release 8/9 system, SRS transmission of the mobile station supports periodic SRS transmission only, and the base station may estimate uplink channel quality of each mobile station through periodic SRS transmission. At this time, the channel estimated by the base station is used for functions such as frequency dependent scheduling, link level adaptation, timing estimation and uplink power control. The base station may transmit SRS uplink configuration to each mobile station UE-specifically or cell-specifically through the SRS parameter or upper layer signaling (for example, RRC signaling). The base station may notify SRS uplink configuration information in a type of SRS uplink configuration information element message as illustrated in Table 7 below.

TABLE 7

| SoundingRS-UL-Config information element |
|---|
| -- ASN1START |
| SoundingRS-UL-ConfigCommon ::=    CHOICE { |
|     release                          NULL, |
|     setup                            SEQUENCE { |
|         srs-BandwidthConfig              ENUMERATED {bw0, bw1, bw2, bw3, bw4, bw5, bw6, bw7}, |
|         srs-SubframeConfig               ENUMERATED { |
|                                              sc0, sc1, sc2, sc3, sc4, sc5, sc6, sc7, |
|                                              sc8, sc9, sc10, sc11, sc12, sc13, sc14, sc15}, |
|         ackNackSRS-SimultaneousTransmission  BOOLEAN, |
|         srs-MaxUpPts                     ENUMERATED {true}    OPTIONAL   -- Cond TDD |
|     } |
| } |
| SoundingRS-UL-ConfigDedicated ::=    CHOICE{ |
|     release                          NULL, |
|     setup                            SEQUENCE { |
|         srs-Bandwidth                   ENUMERATED {bw0, bw1, bw2, bw3}, |
|         srs-HoppingBandwidth            ENUMERATED {hbw0, hbw1, hbw2, hbw3}, |
|         freqDomainPosition              INTEGER (0..23), |
|         duration                        BOOLEAN, |
|         srs-ConfigIndex                 INTEGER (0..1023), |
|         transmissionComb                INTEGER (0..1), |
|         cyclicShift                     ENUMERATED {cs0, cs1, cs2, cs3, cs4, cs5, cs6, cs7} |
|     } |
| } |
| -- ASN1STOP |

The SRS is generated by constant amplitude zero auto correlation (CAZAC) sequences, and the sounding reference signals transmitted from several mobile stations are CAZAC sequences $r^{SRS}(n) = r_{u,v}^{(\alpha)}(n)$ having different cyclic shift values a based on the following Equation 1. In this case, $r^{SRS}(n)$ is the SRS sequence.

$$\alpha = 2\pi \frac{n_{SRS}^{cs}}{8} \quad \text{[Equation 1]}$$

In this case, $n_{SRS}^{cs}$ is set for each mobile station by the upper layer, and has an integer value between 0 and 7. The The following Table 8 illustrates SRS configuration parameters included in the SoundingRS-UL-Config information element message type of Table 7.

TABLE 8

| Sounding RS parameter name | Significance | Signalling type |
|---|---|---|
| srsBandwidthConfiguration | Maximum SRS bandwidth in the cell | Cell-specific |
| srsSubframeConfiguration | Sets of subframes in which SRS may be transmitted in the cell | Cell-specific |

TABLE 8-continued

| Sounding RS parameter name | Significance | Signalling type |
|---|---|---|
| srsBandwidth | SRS transmission bandwidth for a UE | UE-specific |
| frequencyDomainPosition | Frequency-domain position | UE-specific |
| srsHoppingBandwidth | Frequency hop size | UE-specific |
| Duration | Single SRS or periodic | UE-specific |
| srsConfigurationIndex | Periodicity and subframe offset | UE-specific |
| transmissionComb | Transmission comb offset | UE-specific |
| $n^{cs}_{SRS}$ | Cyclic shift | UE-specific |

Referring to Table 7 and Table 8, the SRS configuration information notified for the mobile station from the base station may include SRS configuration parameters such as srsBandwidthConfiguration parameter, srsSubframeConfiguration parameter, srsBandwidth parameter, frequencyDomainPosition parameter, SrsHoppingBandwidth parameter, duration parameter, srsConfigurationIndex parameter, and transmissionComb parameter. The srsBandwidthConfiguration parameter represents maximum SRS bandwidth information within the cell, and the srsSubframeConfiguration parameter represents subframe set information for which the mobile station will transmit SRS in the cell. The base station may notify the mobile station of the srsSubframeConfiguration parameter through cell-specific signaling. As illustrated in Table 7, the base station may signal the srsSubframeConfiguration parameter to the mobile station at a 4-bit size (that indicates sc0, sc1, sc2, sc3, sc4, sc5, sc6, sc7 sc8 sc9 sc10, sc11, sc12, sc13, sc14, sc15). The srsBandwidth parameter represents SRS transmission bandwidth of the mobile station, the frequencyDomainPosition parameter represents the position of the frequency domain, the SrsHoppingBandwidth parameter represents SRS frequency hopping size, the duration parameter represents SRS transmission of one time or periodic SRS transmission, the srsConfigurationIndex parameter indicates periodicity of SRS and subframe offset (for example, time unit from the first subframe of the frame to the subframe for which the first SRS is transmitted), and the transmissionComb parameter represents transmission comb offset.

The base station may notify the mobile station of the srsBandwidthConfiguration parameter and the srsSubframeConfiguration parameter through cell-specific signaling. Unlike this, the base station may notify the mobile station of the srsBandwidth parameter, the frequencyDomainPosition parameter, the SrsHoppingBandwidth parameter, the duration parameter, the srsConfigurationIndex parameter, the transmissionComb parameter through UE-specific signaling.

The 3GPP LTE Release 10 system supports aperiodic SRS transmission for more adaptive uplink channel quality estimation and efficient SRS resource use than the existing system. A triggering method of aperiodic SRS transmission is being currently discussed. For example, the base station may trigger aperiodic SRS transmission through DL/UL grant within the PDCCH. In other words, the base station may perform aperiodic SRS transmission through DL grant or UL grant, which includes aperiodic SRS transmission trigger for triggering aperiodic SRS transmission of the mobile station, or may perform aperiodic SRS transmission by defining a new message format.

The CA introduced in the LTE-A system may be configured within intra band only or by combination of component carriers of inter bands. According to the related art, one uplink timing advance (TA) is configured regardless of CA configuration. However, it may be difficult to configure and use one uplink timing advance due to the difference in frequency features between the inter bands. In this respect, if multiple TA groups are supported, multiple primary cells PCells may be provided.

In the existing 3GPP LTE system, the cell is configured in a unit of random transmission frequency carrier or frequency allocation (FA). On the other hand, the LTE-A system supports a method for transmitting a plurality of transmission frequency carriers through aggregation to increase transmission throughput within a random base station. This has been defined as bandwidth extension or multiple component carrier (CC) aggregation as above. Unlike the LTE system, in the LTE-A system, a plurality of CCs may be configured as transmission resources in a random cell, and a transmission frequency carrier used for downlink transmission or uplink transmission is configured for each mobile station.

The present invention suggests methods for transmitting SRS of uplink physical signals and uplink transport physical channels, that is, PUSCH and PUCCH under a multiple component carrier (CC) aggregation of an LTE-A system. Also, the CA of the related art has defined a procedure of PUSCH/PUCCH and SRS based on one timing advance (TA) scheme. If different TA schemes are applied to the CA status, frequent drop of SRS occurs, whereby a problem occurs in that system throughput may be deteriorated. The present invention suggests various embodiments for solving the problem.

The mobile station may allocate the power based on the following priority due to maximum power control.

<Priority Based Power Allocation>
PUSCH/rate-match PUSCH>SRS
PUSCH/rate-match PUSCH<SRS
PUSCH/rate-match PUSCH with UCI>SRS
PUCCH/shortened PUCCH>SRS
PUCCH/shortened PUCCH<SRS
PUCCH/shortened PUCCH>PUSCH/rate-match PUSCH>SRS
PUCCH/shortened PUCCH>SRS>PUSCH/rate-match PUSCH
PUCCH/shortened PUCCH>PUSCH/rate-match PUSCH with UCI>SRS As will be aware of it from the priority based power allocation, the power of the lowest priority is allocated to the SRS with respect to the PUCCH and the PUSCH.

Figure 6:
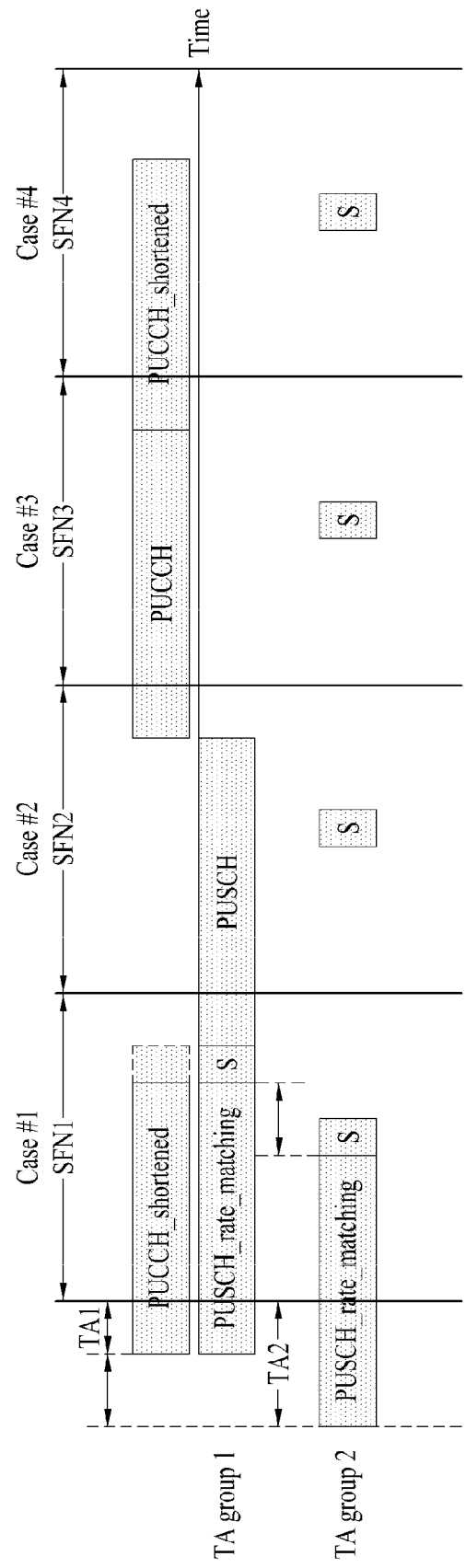
FIG. 6 is a diagram illustrating a method for transmitting SRS when two TAs are applied to CA status.

FIG. 6 is a diagram illustrating a method for transmitting SRS when two TAs are applied to CA status.

Referring to FIG. 6, TA groups include one or more cells and use the same TA timer.

Embodiment 1 (Case 2 in FIG. 6)

As shown in FIG. 6, in a state that transmission timing of PUSCH of TA group 1 is overlapped with transmission timing of SRS ('S' in FIG. 6) of TA group 2 within the same subframe (for example, SFN 1), a method for transmitting SRS will be described. In this case, if the SRS is transmitted for the same subframe in the same cell, a plurality of channels, for example, PUSCH and SRS, PUCCH and SRS, and PUSCH, PUCCH and SRS may be transmitted simultaneously for the same subframe in different cells. Hereinafter, the same concept will be applied to the following embodiments.

For the corresponding subframe for which transmission timing of the PUSCH of the TA group 1 is overlapped with that of the SRS of the TA group 2, the corresponding SC-FDMA (single carrier-frequency division multiple access) (although referred to as DFT-OFDMA, OFDMA, Clustered DFTsOFDMA, and Clustered SC-FDMA, hereinafter, referred to SC-FDMA symbol) symbol of the PUSCH, which is overlapped with the SRS, may be punctured or empty, whereby the SRS may be transmitted. However, if the corresponding SC-FDMA symbol overlapped with the SRS includes a demodulation reference signal (DMRS), the SRS is dropped, and the mobile station transmits the PUSCH only.

In the meantime, if the timing difference between TA groups is not matched with a symbol level (that is, if an overlap interval between the PUSCH and the SRS is not matched exactly in a unit of symbol), the mobile station may drop the SRS or puncture two symbols over the SRS.

Embodiment 2 (Case 1 in FIG. 6)

If transmission timing of the rate-matched PUSCH of the TA group 1 is overlapped with transmission timing of the SRS of the TA group 2 for the corresponding subframe (SFN 1), the mobile station may drop the SRS overlapped with the rate-matched PUSCH for the corresponding subframe, and may transmit only the rate-matched PUSCH of the TA group 1.

Embodiment 3 (Case 3 in FIG. 6)

In the same manner as the Case 3 shown in FIG. 6, the case where transmission timing of the PUCCH of the TA group 1 is overlapped with that of the SRS of the TA group 2 within the corresponding subframe (SFN 3) will be described.

If an overlap interval between the PUCCH of the TA group 1 and the SRS of the TA group 2 is matched in a unit of SC-FDMA symbol, the corresponding SC-FDMA symbol overlapped with the SRS may be punctured or empty. The mobile station may transmit the SRS of the TA group 2 at the punctured or empty interval.

However, if the corresponding SC-FDMA symbol overlapped with the SRS includes a reference signal, the mobile station drops the SRS.

Also, if the timing difference between the TA groups is not matched with a symbol level (that is, if an overlap interval between the PUCCH of the TA group 1 and the SRS of the TA group 2 is not matched in a unit of symbol), the mobile station may drop the SRS or puncture two symbols over the SRS. However, even in this case, in case of overlap with the reference signal, the mobile station drops the SRS.

Embodiment 4 (Case 4 in FIG. 6)

If transmission timing of PUCCH (that is, PUCCH having a format reduced as much as one symbol), which uses a shortened format in the TA group 1, is overlapped with the transmission timing of the SRS of the TA group 2 for the same subframe (SFN 4), a method for transmitting SRS will be described.

In this case, the mobile station drops the SRS overlapped with the PUCCH that uses the shortened format.

Embodiment 5

PUSCH/rate-matched PUSCH and/or PUCCH and SRS are simultaneously transmitted from different cells (cells of different TA groups or cells within the same TA group). The SRS procedure at several cells of the same TA group may follow the method of the 3GPP LTE-A rel-10 or the methods of the embodiments suggested in this specification.

Embodiment 6

In several cases and conditions suggested in the embodiments 1 to 5, the mobile station may drop the SRS or transmit the SRS and PUCCH or/and PUSCH from different TA groups.

As described above, even though the SRS and the PUCCH or/and PUSCH are simultaneously transmitted in the embodiments 1 to 5, if the maximum power limit of the mobile station is exceeded, it is suggested that the SRS is dropped.

According to various embodiments of the present invention, which have been described as above, the SRS may appropriately be dropped in accordance with various conditions such as the maximum power limit condition of the mobile station in a state that the SRS and the PUCCH or/and PUSCH are simultaneously transmitted, whereby efficient communication may be performed.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The method for determining transmission of a sounding reference signal (SRS) in a wireless communication system may be used industrially in various communication systems such as 3GPP LTE, LTE-A and IEEE 802.

The invention claimed is:

1. A method of controlling a sounding reference symbol (SRS) transmission by a user equipment (UE) in a wireless communication system supporting a plurality of component carriers, the method comprising:
   when a sounding reference symbol (SRS) transmission on a first timing advance group is scheduled in a subframe, and a physical uplink control channel (PUCCH) transmission and a physical uplink shared channel (PUSCH) transmission on a second timing advance group are scheduled in the subframe,
   transmitting the PUCCH and PUSCH in the subframe of the second timing advance group; and
   dropping the SRS in the subframe of the first timing advance group when the SRS transmission in the subframe of the first timing advance group overlaps the PUCCH transmission and PUSCH transmission on the second timing advance group in a time domain and a total transmission power of the UE exceeds a maximum transmission power configured for the UE in the overlapped portion.

2. The method of claim 1, wherein the UE is configured with a plurality of timing advance groups.

3. The method of claim 1, wherein the SRS transmission in the subframe of the first timing advance group overlaps the PUCCH transmission and PUSCH transmission on the second timing advance group at a symbol level in the subframe.

4. The method of claim 1, wherein the PUCCH transmission and PUSCH transmission are scheduled in the subframe of the same component carrier of the second timing advance group.

5. A user equipment (UE) capable of controlling a sounding reference symbol (SRS) transmission in a wireless communication system supporting a plurality of component carriers, the UE comprising:
a transmitter; and
a processor,
when a sounding reference symbol (SRS) transmission on a first timing advance group is scheduled in a subframe, and a physical uplink control channel (PUCCH) transmission and a physical uplink shared channel (PUSCH) transmission on a second timing advance group are scheduled in the subframe,
wherein the processor:
controls the transmitter to transmit the PUCCH and PUSCH in the subframe of the second timing advance group; and
drops the SRS in the subframe of the first timing advance group when the SRS transmission in the subframe of the first timing advance group overlaps the PUCCH transmission and PUSCH transmission on the second timing advance group in a time domain and a total transmission power of the UE exceeds a maximum transmission power configured for the UE in the overlapped portion.

6. The UE of claim 5, wherein the processor is further configured with a plurality of timing advance groups for the UE.

7. The UE of claim 5, wherein the SRS transmission in the subframe of the first timing advance group overlaps the PUCCH transmission and PUSCH transmission on the second timing advance group at a symbol level in the subframe.

8. The UE of claim 5, wherein the PUCCH transmission and PUSCH transmission are scheduled in the subframe of the same component carrier of the second timing advance group.

* * * * *